(12) United States Patent
Brosnan et al.

(10) Patent No.: US 7,454,365 B1
(45) Date of Patent: Nov. 18, 2008

(54) POINT OF SALE SECURITY METHOD

(75) Inventors: Susan W. Brosnan, Raleigh, NC (US);
Rosemarie J. DiGeorgio, Raleigh, NC (US); Sheryl A. Paradise, Raleigh, NC (US); Devin S. Sanders, Durham, NC (US); Deborah M. Vertefeuille, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/871,551

(22) Filed: Oct. 12, 2007

(51) Int. Cl.
*G06Q 20/00* (2006.01)

(52) U.S. Cl. .................. 705/16; 340/568.1; 340/571

(58) Field of Classification Search ................ 705/16; 340/568.1, 571
See application file for complete search history.

(56) References Cited

U.S. PATENT DOCUMENTS

| | | | |
|---|---|---|---|
| 5,083,638 A * | 1/1992 | Schneider | 186/61 |
| 5,123,494 A * | 6/1992 | Schneider | 177/50 |
| 5,914,658 A * | 6/1999 | Arakawa | 340/568.8 |
| 5,967,264 A | 10/1999 | Lutz et al. | |
| 6,032,128 A | 2/2000 | Morrison et al. | |
| 7,034,679 B2 * | 4/2006 | Flynn | 340/540 |
| 7,118,082 B2 * | 10/2006 | Brnjac | 248/308 |
| 2003/0047387 A1 | 3/2003 | Bogat | |
| 2006/0180663 A1 | 8/2006 | Morris et al. | |
| 2007/0175988 A1 | 8/2007 | Martin | |

OTHER PUBLICATIONS

"To catch a thief, retailers use electronic surveillance", Williams, Craig, Drug Topics, Nov. 22, 1993, vol. 137, iss. 22, p. 62.*

* cited by examiner

*Primary Examiner*—Matthew S. Gart
*Assistant Examiner*—M. Thein
(74) *Attorney, Agent, or Firm*—Cantor Colburn LLP; Jason O. Piche

(57) ABSTRACT

A method of confirming security of personal items belonging to a shopper during a point of sale transaction is disclosed. The method includes sensing a signal of a weight sensor indicative of a weight of the personal items placed upon an interface of a security monitor of a point of sale checkout device. The method further includes activating an alarm in response to sensing a change in the signal of the weight sensor that is indicative of a removal of the personal items during the point of sale transaction. The method also includes activating the alarm in response to sensing a continued state of the signal of the weight sensor following the point of sale transaction.

1 Claim, 4 Drawing Sheets

POINT OF SALE SECURITY METHOD

BACKGROUND OF THE INVENTION

1. Field of the Invention

This invention relates generally to point of sale devices, and particularly to point of sale checkout devices.

2. Description of Background

One difficulty associated with the use of existing point of sale checkout devices is that all flat space associated with the device is taken up with functional items, such as a scanner, a security scale, a transfer belt, and the purchased items. Therefore, there is little available space upon which to place personal items, such as a purse, wallet or handbag, for example, which may be carried by the consumer while using the checkout device. Currently, such personal items are held during the self-checkout process, or can be left within a carriage, thereby exposing the personal items to a potential for theft, and potentially reducing a focus of the shopper upon tasks related to the point of sale transaction. Accordingly, while existing checkout devices are suitable for their intended purpose, there is a need in the art for a checkout arrangement that overcomes these drawbacks.

SUMMARY OF THE INVENTION

An embodiment of the invention includes a method of confirming security of personal items belonging to a shopper during a point of sale transaction. The method includes sensing a signal of a weight sensor indicative of a weight of the personal items belonging to the shopper placed upon an interface of a security monitor of a point of sale checkout device. In response to sensing a change in the signal of the weight sensor indicative of a removal of the personal items belonging to the shopper during the point of sale transaction, activating an alarm. The method further includes activating the alarm in response to sensing a continued state of the signal of the weight sensor following the point of sale transaction.

System and computer program products corresponding to the above-summarized methods are also described herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which monitors a presence and security of a personal item while a shopper utilizes a checkout device.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

An embodiment of the invention provides a self-checkout personal item security monitor that monitors a presence and security of a personal item while a shopper utilizes the self-checkout device. As used herein, the term "personal item" shall refer to those items belonging to the shopper upon entry into a shopping facility, such as a purse, wallet, umbrella, clothing, car keys, or other similar items typically carried by a customer visiting a retail or business enterprise. The security monitor will include at least one of a shelf, a hook, a sling, and combinations thereof to secure the personal item and monitor its presence while a shopper utilizes the self-checkout device.

Figure 1:
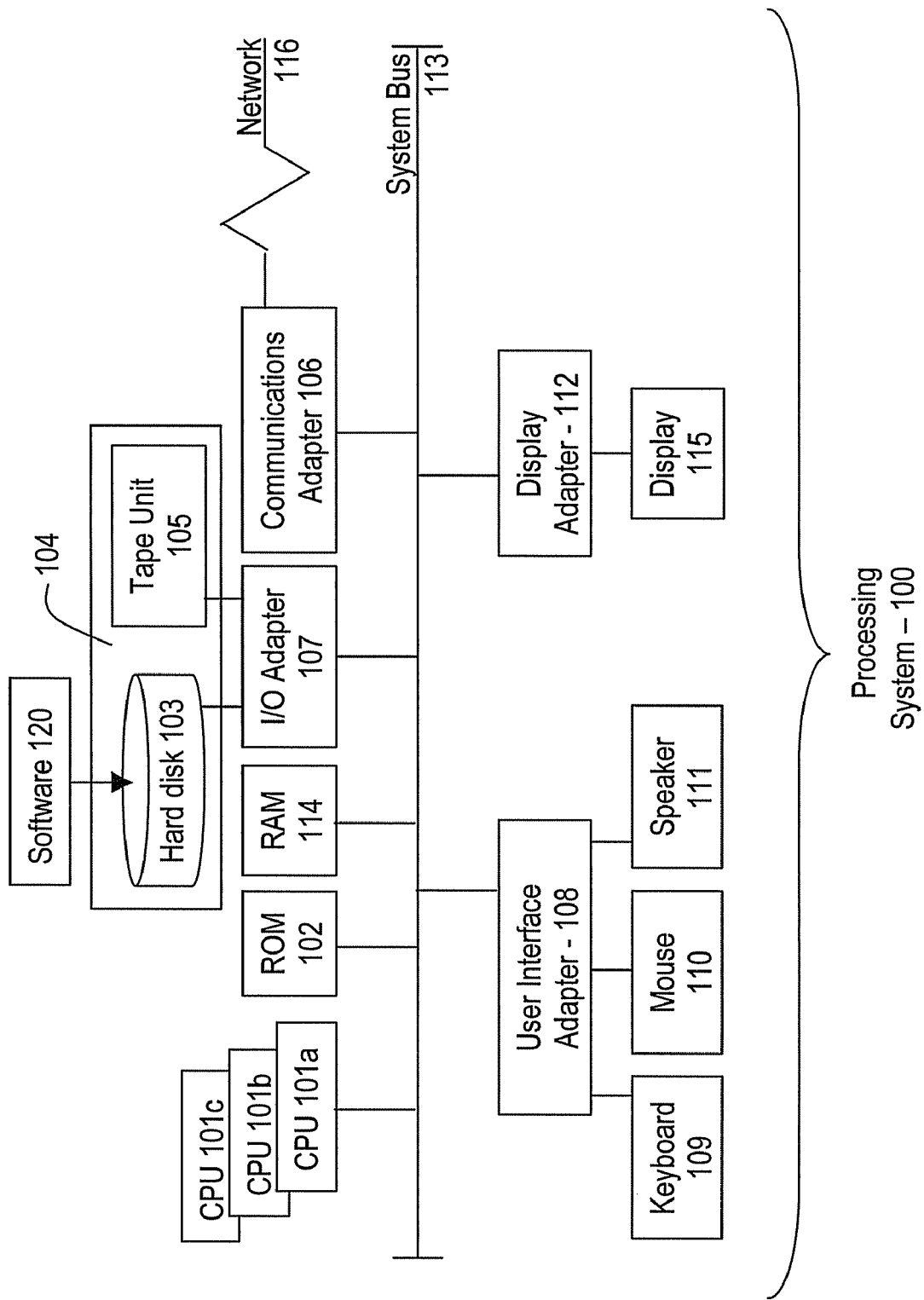
FIG. 1 is a schematic block diagram illustrating one example of an infrastructure for operation of a personal item security arrangement.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer, personal digital assistant (PDA) or other computing device.

Examples of operating systems that may be supported by the system 100 include Windows 95, Windows 98, Windows NT 4.0, Windows XP, Windows 2000, Windows CE, Windows Vista, Macintosh, Java, LINUX, and UNIX, or any other suitable operating system. The system 100 also includes a network interface 116 for communicating over a network. The network can be a local-area network (LAN), a metro-area network (MAN), or wide-area network (WAN), such as the Internet or World Wide Web.

Users of the system 100 can connect to the network through any suitable network interface 116 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 100 includes machine readable instructions stored on machine readable media (for example, the mass storage 104) for capture and interactive display of information shown on the screen 115 of a user. As discussed herein, the instructions are referred to as "software" 120. The software 120 may be produced using software development tools as are known in the art.

Figure 2:
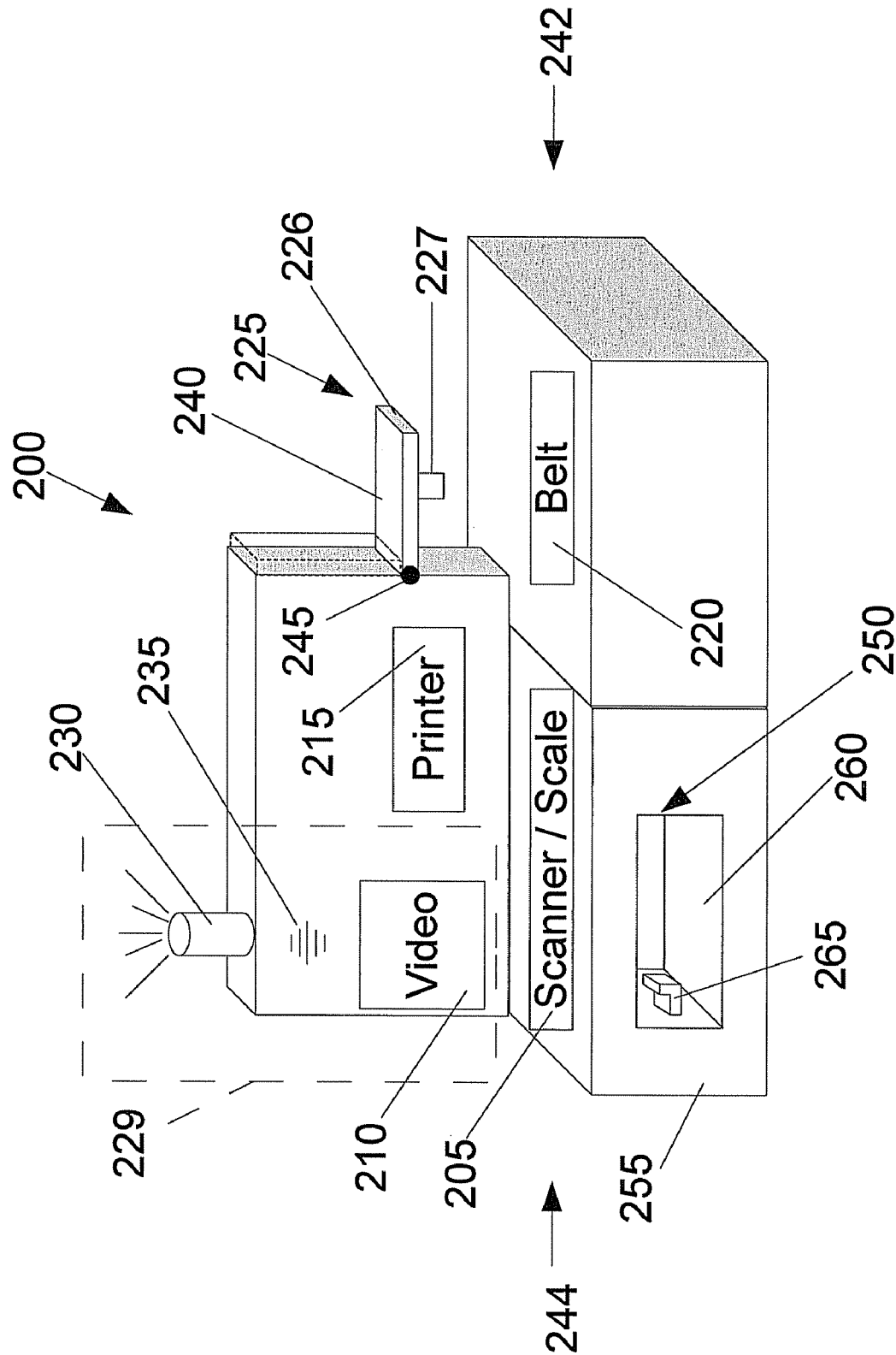
FIG. 2 is a schematic diagram illustrating one example of a point of sale device in accordance with an embodiment of the invention.

Referring now to FIG. 2, an embodiment of a checkout device 200, such as a self-checkout device for example, is depicted. The self-checkout device 200 includes a scanner 205 to scan a universal product code (UPC) or barcode associated with purchased items, a video interface 210 to display a list of purchased items and various payment options, a printer 215 to print a record of the transaction, and a belt 220 to transport the purchased items to a packaging area, such as at an end of the belt 220, for example. The scanner 205 may further include a scale to weigh purchased items, such as produce at a grocery store for example. It will be appreciated that scanner 205, video interface 210, printer 215, and belt 220 are each in signal communication with the processor 101 to perform their various functions.

The device 200 further includes at least one personal item security monitor 225 (also herein referred to as a "security monitor") in signal communication with the processor 101. The security monitor 225 includes an interface 226 and a weight sensor 227 responsive to placement of personal items upon the interface 225. (As used herein, reference numerals 225, 226 and 227 shall generally refer to the monitor, interface, and sensor respectively, and shall be incorporated within each of the embodiments described herein.) For example, for each of the embodiments, the weight sensor 227 may be a scale element in signal connection with the processor 101 that senses the weight of the personal items and generates a signal indicative of a presence of the personal items placed upon the interface 226. It will be appreciated that removal of the personal items, and thus the weight of the items, from the interface 226 indicates a possible theft of the items. Therefore, in an embodiment, the processor 101, executing the software 120, is responsive to a change in the signal prior to completion of the transaction as an indication of removal of the personal items from the interface 226, to alert the shopper of the removal of the personal items from the interface 226 via an alarm 229. Non-limiting examples of the alarm 229 include any of a light 230, an audible tone generated via a speaker 235, and visual reminder displayed via the video interface 210. Additionally, following completion of the transaction, a continued or non-changing state of the signal indicates continued presence of the personal items upon the interface 226, and therefore a possible inadvertent abandonment of the personal items. Accordingly, each embodiment of the monitor 225 disclosed herein is responsive to the processor 101, executing the software 120, to detect continued presence of the personal items following completion of the transaction and alert the shopper, via the alarm 229 to remember to remove the personal items before leaving the shopping facility.

In one embodiment the interface 226 of security monitor 225 includes a shelf 240 disposed on a first side 242 of the device 200 proximate the belt 220. In this way the shelf 240 and the contents placed thereupon remain in control of the shopper, who typically stands proximate the scanner 205, while scanning purchased items. Therefore, the shopper provides a physical barrier between the contents placed upon the shelf 240 and other shoppers who may be present within the shopping facility, situated to a second side 244 of the device, such as the left of the device 200 depicted in FIG. 2. The shelf 240 may include a hinge 245 so that the shelf 240 can be folded up against a wall of the device 200, as depicted in dashed lines in FIG. 2.

In another embodiment, the interface 226 of the security monitor 225 includes an opening 250 inset into a base 255 of the device 200. The opening 250 may be provided in addition to the shelf 240. The personal items may be placed upon a bottom surface 260 within the opening 250. As described above, the sensor 227 is in operable communication with the bottom surface 260 of the opening 250, and is responsive to sense the weight of the personal items. Further, as described above, the shopper standing proximate the scanner 205 presents a physical barrier between the contents placed within the opening 250 and other shoppers who may be present within the shopping facility, thereby retaining control of the possessions. Additionally, because the opening 250 is inset into the base 255, it will not impede movement of the shopper, and is therefore contemplated to be unlikely to be a cause of any shopper injury.

In yet another embodiment the interface 226 of security monitor 225 includes a hook 265 placed within the opening 250. As described above, the sensor 227, in operable communication with the hook 265, will be responsive to sense the weight of the personal items placed thereupon. Personal items, such as purses that include a strap for example, can be placed directly upon the hook 265. Additionally, the hook 265 may be used in conjunction with a sling, such as a net bag for example, to hold personal items that do not include a strap, such as wallets for example. As described above, the sensor 227 is in operable communication with the hook 265, and is responsive to sense the weight of the personal items. Further, as described above, the shopper standing proximate the scanner 205 presents a physical barrier between the contents placed upon the hook 265 within the opening 250 and other shoppers who may be present within the shopping facility, thereby retaining control of the possessions. Additionally, because the hook 265 is disposed within the opening 250 that is inset into the base 255, the hook 265 will not impede movement of the shopper, and is therefore contemplated to be unlikely to be a cause of any shopper injury.

In a further embodiment, the interface 226 of security monitor 225 includes a retractable hook 265 and the sensor 227 in operable communication with the hook 265, disposed within the opening 250 beneath the scanner 205. In response to the beginning of a transaction, the retractable hook 265 is responsive to the processor 101 to extend or translate forward out of the opening 250, to allow the shopper to place personal items, such as purses that include a strap for example, directly upon the hook 265. Additionally, the hook 265 may be used in conjunction with a sling, such as a net bag for example, to hold personal items that do not include a strap, such as wallets for example. Further, the software 120 may query the shopper as to whether they would like to place personal items upon the retractable hook 265 via the video interface 210. If the shopper responds "no" or does not place personal items upon the hook within a defined time limit, the hook 265 will retract into the opening 250. Subsequent to removal of the personal items following completion of the transaction, the retractable hook 265 is responsive to the processor 101 to retract or translate back into the opening 250. As described above, the shopper standing proximate the scanner 205 presents a physical barrier between the contents placed upon the retractable hook 265 and other shoppers who may be present within the shopping facility, thereby retaining control of the possessions. Additionally, because the retractable hook 265 retracts into the opening 250 that is inset into the base 255, the retractable hook 265 will not impede movement of the shopper, and is therefore contemplated to be unlikely to be a cause of any shopper injury.

Figure 3A:
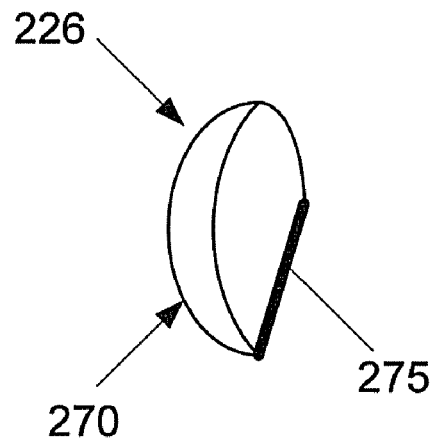
FIGS. 3A-3C are schematic diagrams illustrating one example of a security monitor interface in accordance with an embodiment of the invention.
Figure 3B:
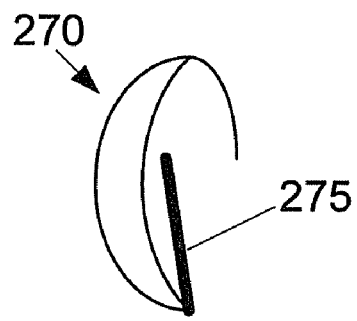
Figure 3C:
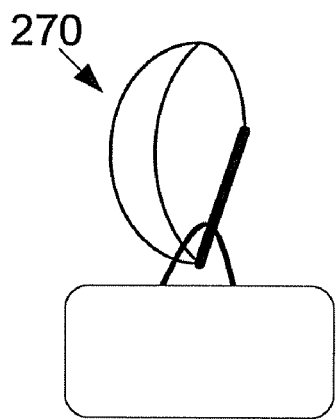

FIGS. 3A through 3C depict another interface 226. A self-closing hook 270, such as may be known as a carabiner for example, includes a gate 275 that is biased toward a closed position as depicted in FIG. 3A. Application of force opposite the bias will cause the gate 275 to displace toward an open position as depicted in FIG. 3B for placement of personal items onto, or removal of personal items from the self-closing hook 270. The self-closing hook 265 may be used in conjunction with a sling, such as a net bag for example, to hold personal items that do not include a strap, such as wallets for example. FIG. 3C depicts an example of a personal item, such as a purse for example, secured by the self-closing hook 270. Because the gate 275 of the self-closing hook 270 secures the personal item, it increases an amount of time to remove the personal item from the hook 270, thereby discouraging personal item theft. The self-closing hook 270 has a flat profile, and may therefore be disposed upon an exterior of the device with minimal obstruction or impediment to a movement of the shopper, and is therefore contemplated to be unlikely to be a cause of any shopper injury. Additionally, the self-closing hook 270 may be attached to the monitor 225 via a retractable cord, to facilitate increased ease of use in attaching and detaching the personal items. In one embodiment, the self-closing hook 270 may be disposed within the opening 250.

While an embodiment of the invention has been depicted as a self-checkout device with a left to right product flow, having the scanner 205 disposed to the left of the transfer belt 220, it will be appreciated that the scope of the disclosure is not so limited, and is contemplated to apply to checkout devices 200 that have other product flow, such as right to left, with the scanner 205 disposed to the right of the transfer belt, checkout devices 200 that are absent belts 205 and may be known as "scan and bag" systems, assisted checkout devices, and self-service informational kiosks, for example.

Figure 4:
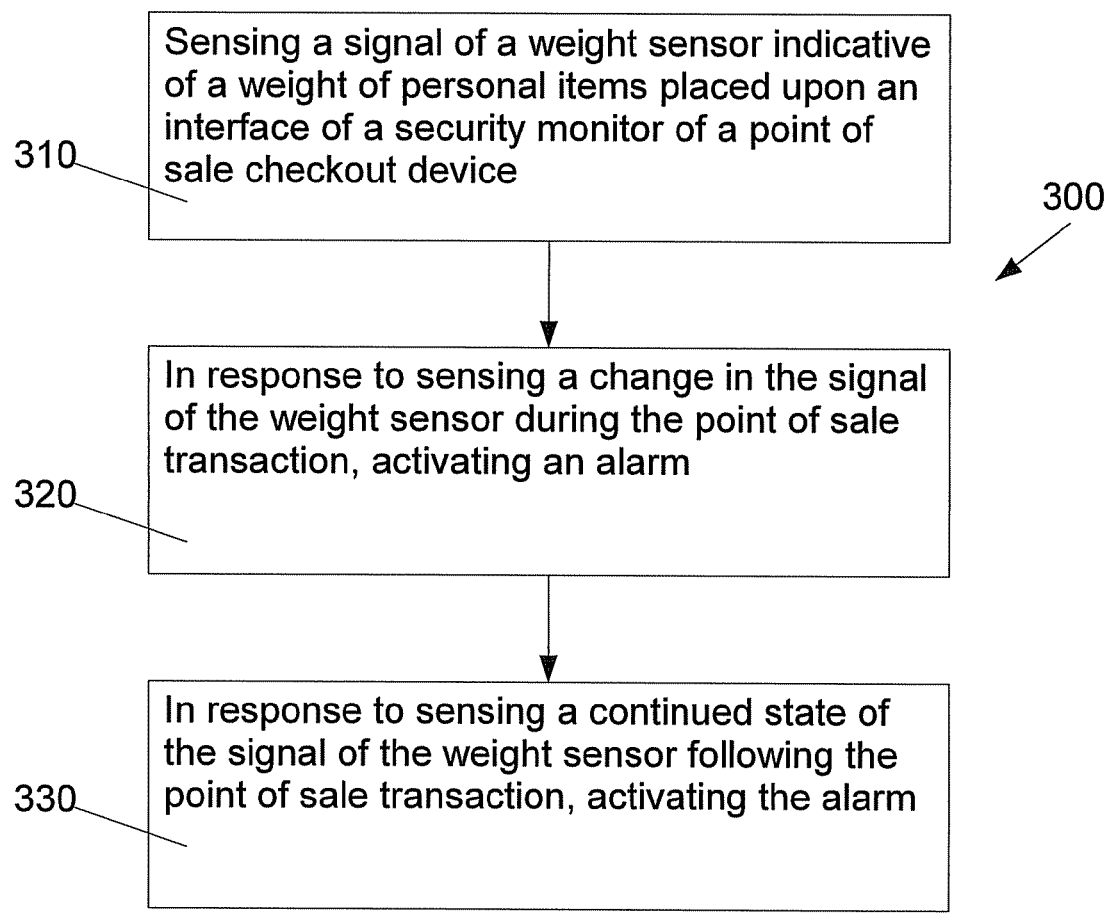
FIG. 4 is a flowchart that illustrates one embodiment of a method for confirming security of personal items during a point of sale transaction.

In view of the foregoing, the system 100 facilitates a method of confirming security of personal items belonging to a shopper during a point of sale transaction. FIG. 4 depicts a flowchart 300 of process steps of an embodiment of the method. The method begins at block 310 by sensing the signal of the weight sensor 227 that is indicative of the weight of personal items placed upon the interface 226 of the security monitor 225 of the point of sale checkout device 200. At block 320, in response to the processor 101 sensing a change in the signal generated by the weight sensor 227 during the point of sale transaction, which is likely to indicate an undesired removal of the personal items from the interface 226, the method proceeds with the processor 101 activating the alarm 229. Additionally, at block 330, in response to the processor 101 sensing a continued state of the signal of the weight sensor following the point of sale transaction, such as to indicate an inadvertent abandonment of the personal items, the method includes activating the alarm 219 to remind the shopper to retrieve the personal items.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

An embodiment of the invention may be embodied in the form of computer-implemented processes and apparatuses for practicing those processes. Embodiments of the present invention may also be embodied in the form of a computer program product having computer program code containing instructions embodied in tangible media, such as floppy diskettes, CD-ROMs, hard drives, USB (universal serial bus) drives, or any other computer readable storage medium, wherein, when the computer program code is loaded into and executed by a computer, the computer becomes an apparatus for practicing the invention. Embodiments of the invention also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of confirming security of personal items belonging to a shopper during a point of sale transaction, the method comprising:
   in response to a beginning of the point of sale transaction, automatically extending an interface comprising a retractable hook from an opening inset within the base of the point of sale checkout device;
   sensing, via a processor responsive to executable code, a signal of a weight sensor indicative of a weight of the personal items belonging to the shopper placed upon the retractable hook, wherein the retractable hook is in operable communication with the weight sensor;
   in response to sensing a change in the signal of the weight sensor indicative of a removal of the personal items belonging to the shopper during the point of sale transaction, activating an alarm;
   in response to sensing a continued state of the signal of the weight sensor following the point of sale transaction, activating the alarm; and
   in response to an end of the point of sale transaction and removal of the personal items, automatically retracting the interface comprising the retractable hook into the opening inset within the base of the point of sale checkout device.

* * * * *